UNITED STATES PATENT OFFICE 2,570,892

SEALING AGENTS

Chester N. White, Ridley Park, Pa., assignor to Sun Oil Company, Philadelphia, Pa., a corporation of New Jersey No Drawing. Application February 24, 1949, Serial No. 78,240

18 Claims. (Cl. 260—14)

This invention relates to a sealing agent of the type comprising an aqueous dispersion of a partially condensed thermosetting resin. More particularly, it relates to a sealing agent of this type containing an additive material capable of rendering that sealing agent more useful in the sealing of porous subterranean formations.

In the drilling of wells for oil, it is frequently advantageous to seal off porous formations traversed by the borehole. For example, when formations are encountered which are sufficiently porous that appreciable amounts of the drilling mud pass into the formations and little or no mud returns to the surface, it is usually desirable to seal off those formations with a material impervious to drilling fluids. This loss of drilling mud is known as "lost circulation" and may also be due to a breakdown of formations by the hydrostatic pressure of the mud column.

It is also frequently advantageous to seal off certain formations in order to prevent ingress of undesirable fluids, such as gases or water, from those formations into the well, while the well is being produced. Thus, water-bearing sands are often sealed off from the borehole.

Heretofore, various methods have been employed for sealing porous formations. One such method comprises pumping cement grout into the well, forcing it into the formation, and allowing it to harden. One disadvantage of this method is that in many cases, it is impossible to control effectively the extent of penetration of cement into the formation, with the result that the cement is forced in so far that it is difficult to reopen the formation by conventional methods, such as fun perforation.

Another method previously employed for sealing porous formations comprises pumping a resin-forming liquid into the well, forcing it into the formation, and allowing it to condense and harden at the formation temperature. With this method also, there is the disadvantage of too deep penetration into the formation. Furthermore, in case where very porous formations are situated adjacent less porous formations or where there are crevices within porous formations, large amounts of resin must be forced into the more penetrable sections of the formations before the less penetrable sections are sealed, with the result that this method becomes quite expensive.

A third method of the prior art comprises the use, as sealing agent, of an aqueous dispersion of a thermosetting resin which has been partially condensed to a particular intermediate state of condensation in which the resin is a plastic solid capable of being dispersed in water by stirring without the aid of an emulsifying agent to form a suspension which is stable for at least five hours. In this method, when the resin has been condensed to the proper intermediate stage, the aqueous resin dispersion will, when pumped into the well and directed against the face of the porous formation, form a resin plug at the face without substantial penetration of the resin into the body of the formation, even though the pores at the face are larger than the dispersed resin particles. At the formation temperature, the resin plug completes its condensation and becomes a hard sheath impervious to drilling fluids.

The preparation of sealing agents of the aqueous resin dispersion type is disclosed and claimed by Stewart S. Kurtz et al. in the following U. S. Patents: Reissue 23,393, July 24, 1951, reissued on application 226,064, filed May 12, 1951, the original patent being No. 2,457,160 issued December 28, 1948, from application Serial No. 609,927, filed August 9, 1945; 2,562,866, issued July 31, 1951, from application Serial No. 54,586, filed October 14, 1948; 2,562,867, issued July 31, 1951, from application Serial No. 54,587, filed October 14, 1948; 2,559,162, issued July 3, 1951, from application Serial No. 54,588, filed October 14, 1948.

The following are given as examples of materials which may be reacted under condensation conditions to give thermosetting resins having the properties described above: one part of phenol or cresylic acid and 1–4 parts of formalin or furfural, one part of melamine and ⅛–20 parts of formalin, one part of melamine and 1–8 parts of furfural, one part of urea and 1½–2½ parts of formaline, one part of urea and 1–6 parts of furfural, one part of thiourea and ⅛–5 parts of formalin, and one part of thiourea and ½–6 parts of furfural.

I have discovered that the addition to an aqueous resin dispersion sealing agent of a water-soluble or water-dispersible polysaccharide having a molecular weight greater than about 5000 is especially effective to decrease the amount of water which will pass from the sealing agent through a given porous bed when the sealing agent is applied thereto at a given pressure, thus reducing the amount of the sealing agent required to seal off the bed. Also, formations of greater porosity may be sealed off by a given sealing agent of the aqueous resin dispersion type if such a polysaccharide is incorporated therewith. The term polysaccharide, where used in this specification, refers to a carbohydrate containing a plurality of molecules of simple sugars.

High molecular weight polysaccharides which are suitable for use in the invention include those which contain a substantial number of neutralized carboxylate groups per molecule, and those which contain no substantial number of carboxylate groups. The latter polysaccharides include such materials as agar-agar, starch, and cellulose. The former include the sodium salt of carboxy methyl cellulose, and natural gums, which contain metal salts of uronic acids.

Water-soluble or water-dispersible natural gums, as contemplated in the invention, include those excretions from plants which either swell in water or form colloidal solutions therewith, which are viscous and glutinous when moist, and which contain complex organic acids which hydrolyze to simpler acids and certain sugars. Among the natural gums which are useful in the invention, certain ones are preferred in that the aqueous resin dispersions containing them form plugs which will set to a hard strong sheath when cured at 100° F. for 48 hours under 500 pounds per square inch differential pressure. These preferred gums include gum arabic, manila gum, and tragacanth gum. Other gums such as gamboge, ghatti gum, and karaya gum, improve the plugging properties of an aqueous resin dispersion and are therefore useful in the invention, but they are not preferred because the resulting sealing agents form resin plugs which do not form hard strong sheaths when cured under these conditions. It is to be noted that, although a hard sheath is desirable in some cases, a plug having less mechanical strength is useful in some applications of the invention.

It is to be noted that the natural resins, a group of high molecular weight materials of a non-polysaccharide nature, such as camphor, catechu, copal, dammar, elemi, guaiacum, mastic, sandarac, and shellac, are not suitable for use in the invention, in that they give relatively little, if any, reductions in filtrate volume when used as additive materials for aqueous synthetic resin dispersion sealing agents.

The sealing properties of an aqueous resin dispersion, with which has been incorporated a high molecular weight polysaccharide, according to the invention, improve with increasing concentration of polysaccharide in the sealing agent. Generally speaking, the rate of improvement in sealing properties decreases with increase in polysaccharide concentration; and is such that no material benefit attends the use of more than 20% by weight of the additive, although other concentrations naturally are not excluded from the scope of the invention. In most instances, a practicably useful concentration will be found in the range from about ½ to about 10% by weight.

The following examples are presented as illustrative of the invention:

*Example I*

Aqueous dispersions of partially condensed phenol-formaldehyde resins were prepared according to the procedure described in U. S. Patent No. 2,457,160. In the preparation of the resin, the ratio of phenol to formalin was 1 to 3. The reaction was carried out in the presence of caustic soda at a temperature of 95° C.–100° C., and was interrupted by separation and sudden cooling of the resin phase after 200 minutes' reaction time. The synthetic resin product was dispersed in water by mechanical agitation without the use of an emulsifying agent.

To dispersions thus prepared were added various polysaccharides in 3% concentration. The dispersions were mixed under mechanical agitation to give the sealing agents listed in the table below.

The sealing properties of each sealing agent were determined for a sand bed composed of 20–40 mesh particles. The bed was about two inches in depth and 0.6 square inch in cross-sectional area.

In each run, the sealing agent to be tested was introduced into the space above the filter bed in the vessel containing the latter. A differential pressure of about 730 millimeters of mercury was applied across the filter bed for a period of 30 minutes. Unfiltered sealing agent was present above the bed during the entire 30 minutes. The amount of liquid passing through the bed in 30 minutes was collected and its volume measured, as recorded in the table below.

Subsequently, the resin plug in the upper part of the sand bed was cured at 100° F. for 48 hours under 500 pounds per square inch differential pressure, in order to determine the nature of the ultimate filter cake. The quality of the filter cake obtained in each case is recorded in the table below.

| Additive, 3% Concentration | Volume of Filtrate through 20–40 Mesh Bed, in Milliliters | Nature of Filtrate Cake, with Curing at 100° F. |
|---|---|---|
| No additive | 272 | Strong and hard. |
| Agar-agar | 14 | Do. |
| Gum arabic | 16 | Do. |
| Manila gum | 55 | Do. |
| Tragacanth gum | 0 | Do. |
| Ghatti gum | 0 | Brittle and crumbly. |
| Jungle gum | 0 | Do. |
| Karaya gum | 0 | No curing evident. |
| Gamboge | 5 | Do. |
| Thin-boiling starch | 35 | |
| Sodium carboxy methyl cellulose | 0 | |

The high molecular weight polysaccharide additives gave reductions in filtrate volume in the range 79–100%.

Certain of the sealing agents require higher temperatures for curing and therefore showed imperfect or no curing under the conditions of this example.

Of the polysaccharide materials, sodium carboxy methyl cellulose and several gums effected a seal immediately and allowed no appreciable filtrate at 30 millimeters pressure. Of these gums, however, only tragacanth gave a sealing agent capable of forming a hard strong sheath on curing under the conditions of this example.

By way of comparison, yellow dextrine (a polysaccharide having a molecular weight less than 5000) gave very little reduction in filtrate volume. Thin boiling starch (a polysaccharide having a molecular weight greater than 5000) gave an 87% reduction.

*Example II*

Aqueous dispersions of partially condensed phenol-formaldehyde resins were prepared as in Example I. To each was added gum arabic in varying concentrations. The sealing properties of each sealing agent thus prepared were determined for a 20–40 mesh bed as in Example I.

The amounts of liquid passing through the bed in each run are listed in the table below:

| Concentration of Gum Arabic, in Per Cent | Volume of Filtrate Through 20-40 Mesh Bed, in Milliliters |
|---|---|
| 0 | 272 |
| 1.0 | 52 |
| 5.0 | 11 |
| 10.0 | 6 |

It may be seen from the above table that the ability of the sealing agent to seal off a 20-40 mesh bed increases with increasing concentrations of the additive. The rate of increase in sealing ability, however, decreases with increasing additive concentrations.

*Example III*

Certain of the sealing agents prepared in Example I were tested on sand beds of varying sizes. Each bed was about two inches in depth and 0.6 square inch in cross-sectional area and consisted of particles within ranges as indicated in the table below. The procedure of determining the sealing properties was the same in each case as in Example I.

| Additive, 3% Concentration | Volume of Filtrate in Milliliters | | | | | | |
|---|---|---|---|---|---|---|---|
| | 16-20 Mesh | 10-16 Mesh | 6-10 Mesh | 4-6 Mesh | ¼ Inch, 4 Mesh | ⅜-¼ Inch | ½-⅜ Inch |
| No additive | 757 | 720 | | | | 1,600 | 4,400 |
| Agar-agar | | | 8 | 20 | 25 | 20 | 4,400 |
| Gum arabic | 82 | | 135 | 122 | 160 | 145 | |
| Manila gum | | | 255 | 274 | 281 | 265 | |
| Tragacanth | | | 0 | 5 | 16 | 38 | 175 |
| Ghatti gum | | | 0 | 18 | 15 | 1,600 | 4,400 |
| Karaya | | | 0 | | 0 | 0 | 4,400 |
| Thin-boiling starch | | | | 56 | 125 | 1,600 | |
| Sodium carboxy methyl cellulose | | | | | | 7 | 190 |
| Gamboge | | 15 | | | | | |

The above table demonstrates the fact that, in general, the ability of a sealing agent to seal off a sand bed decreases as the size of the bed particles increases. With certain types of polysaccharides as additives in 3% concentration, there are critical porosities; that is, with sand beds of porosity greater than a certain value, the amount of filtrate obtained suddenly increases to an amount approximately the same as that obtained without an additive in the sealing agent. Within the ranges of bed porosities tested, that is true of agar-agar, ghatti gum, karaya, and thin-boiling starch.

In some cases, in the preceding examples, where the filtrate volumes were relatively large, the values given in the table were estimated by measuring filtrate volumes for a period less than thirty minutes and multiplying that volume by the ratio of thirty to the lesser period.

In some cases, where filtrate volumes obtained with sealing agents containing additives were very large, the values given were estimated from filerate volumes obtained with the resin dispersion alone.

I claim:

1. A sealing agent comprising in stable admixture a minor proportion of a polysaccharide having a molecular weight greater than about 5000 and a major proportion of a non-colloidal aqueous suspension of dispersed condensation-type thermosetting resin selected from the group consisting of phenol-aldehyde, cresylic acid-aldehyde, melamine-aldehyde, urea-aldehyde, and thiourea-aldehyde resin, partially condensed to the intermediate plastic solid stage at which the resin is dispersible in water by stirring without the aid of an emulsifying agent to form a non-colloidal suspension, said aqueous suspension being characterized by its ability, when forced into a bed of 10 mesh sand, to form a resin plug at the face of the bed, which, upon application of heat, will condense to a hard layer impervious to drilling fluid.

2. Sealing agent according to claim 1 wherein the polysaccharide is a natural gum.

3. Sealing agent according to claim 1 wherein the polysaccharide is tragacanth gum.

4. Sealing agent according to claim 1 wherein the polysaccharide is gum arabic.

5. Sealing agent according to claim 1 wherein the polysaccharide is a sodium salt of carboxy methyl cellulose.

6. Sealing agent according to claim 1 wherein the polysaccharide is agar-agar.

7. Sealing agent according to claim 1 wherein the polysaccharide is starch.

8. Sealing agent according to claim 1 wherein the polysaccharide comprises less than about 20% of the sealing agent.

9. Sealing agent according to claim 1 wherein the polysaccharide comprises about ½ to about 10% of the sealing agent.

10. A sealing agent comprising in stable admixture a minor proportion of a polysaccharide having a molecular weight greater than about 5000 and a major proportion of a non-colloidal aqueous suspension of dispersed phenol-formaldehyde resin partially condensed to the intermediate plastic solid stage at which the resin is dispersible in water by stirring without the aid of an emulsifying agent to form a non-colloidal suspension, said aqueous suspension being characterized by its ability, when forced into a bed of 10 mesh sand, to form a resin plug at the face of the bed, which, upon application of heat, will condense to a hard layer impervious to drilling fluid.

11. Sealing agent according to claim 10 wherein the polysaccharide is a natural gum.

12. Sealing agent according to claim 10 wherein the polysaccharide is tragacanth gum.

13. Sealing agent according to claim 10 wherein the polysaccharide is gum arabic.

14. Sealing agent according to claim 10 wherein the polysaccharide is a sodium salt of carboxy methyl cellulose.

15. Sealing agent according to claim 10 wherein the polysaccharide is agar-agar.

16. Sealing agent according to claim 10 wherein the polysaccharide is starch.

17. Sealing agent according to claim 10 wherein the polysaccharide comprises less than about 20% of the sealing agent.

18. Sealing agent according to claim 10 wherein the polysaccharide comprises about ½ to about 10% of the sealing agent.

CHESTER N. WHITE.

REFERENCES CITED

The following references are of record in the file of this patent:

UNITED STATES PATENTS

| Number | Name | Date |
|---|---|---|
| 2,069,178 | Dent | Jan. 26, 1937 |
| 2,245,245 | Alexander | June 10, 1941 |
| 2,245,491 | Menger | June 10, 1941 |
| 2,349,181 | Lerch | May 16, 1944 |
| 2,370,517 | Bass | Feb. 27, 1945 |
| 2,457,160 | Kurtz | Dec. 28, 1948 |